Patented Jan. 12, 1943

2,308,194

UNITED STATES PATENT OFFICE 2,308,194

ELECTRIC WELDING

Wilber B. Miller, Niagara Falls, N. Y., assignor to The Linde Air Products Company, a corporation of Ohio No Drawing. Application March 21, 1941, Serial No. 384,478

2 Claims. (Cl. 219—10)

The invention relates to electric welding and provides improvements in electric welding processes of the type described, for instance, in United States Patent 2,043,960, issued on application of Lloyd T. Jones, Harry E. Kennedy and Maynard R. Rotermund.

Electric welding processes of this type are characterized notably by the fact that molten metal is deposited from a bare metal electrode onto a metal workpiece and coalesced with the latter while the entire welding zone, including the melting end of the electrode and the molten deposited metal, is covered by a deep blanket of welding composition or welding medium consisting of an unbonded, initially comminuted mineral-like material which smothers or blankets the electric arc that otherwise would be visibly present. The quality of the weld produced in this type of welding process depends to a very large extent on the composition of the welding medium. The general characteristics of satisfactory welding media are described in Patent 2,043,960, and the metasilicate compositions advocated in the patent have been found entirely satisfactory for most commercial uses with but slight modification to meet the requirements of individual cases. In the subsequent development of the art, special media have been devised to solve various specific problems, for instance as described in my Patent 2,228,639 and in Patent 2,200,737, E. A. Clapp.

Some difficulty is encountered in welding steels in which sulphur occurs in segregated bands, constituting what are known as "sulphur-banded" steels. These sulphur bands in the steel plate have been found to contain as high as 0.15% sulphur when the average sulphur content of the plate was 0.04%. When welds are made in such steel using heretofore known welding media, cracks sometimes emanate from the sulphur bands in the plate at the junction of the weld and plate and progress into the weld metal. It is an important object of the present invention to provide a novel welding composition which is particularly adapted for use in welding high sulphur or sulphur-banded steels and the use of which in welding operations of the kind described makes possible the production of better welds in such steel than can be obtained with other welding media heretofore known.

This object is attained by the present invention which provides, as an improvement in a process of electrically welding sulphur-banded steel by fusion-deposition of metal from a welding rod under a blanket of welding medium, blanketing welding media having a composition approximating a manganese-aluminum-silicate. Preferably, such media prefused are comminuted mixtures containing about 30% to 65% oxidic manganese (calculated as MnO) 9% to 40% alumina and the remainder principally silica, the silica being in excess of 17%. Up to about 5% of calcium molybdate or other readily reducible molybdenum salt may be included to some advantage. If very smooth weld deposits are required, a small proportion, say about 4% to 15%, of calcium fluoride may be included in the composition. Incidental impurities such as lime, magnesia, combined ferric oxide, and titanium oxide may be present without detrimentally affecting the quality of weld produced, but preferably should not exceed 10% of the composition. The presence in the welding media of ingredients which would evolve deleterious quantities of gas during welding should be avoided. A particularly useful composition contains 34% to 40% manganese oxide, 15% to 25% alumina, 4% to 5% calcium fluoride, remainder silica and incidental impurities, the silica being between 31% and 42%.

The welding media of the invention are preferably prepared for use by fusing the ingredients and then solidifying and comminuting the material. If calcium fluoride is used, however, it is preferably admixed after the remainder of the welding medium has been fused.

The invention includes a method of welding high sulphur or sulphur-banded steels, for example steels containing more than about 0.03% of sulphur mostly distributed as bands of sulphides, which method comprises electrically melting and depositing metal from a bare welding rod and coalescing the molten metal with such steel while blanketing the welding zone, including the electrode end and the melting and depositing metal, with a welding medium of the composition of the invention.

Tests have indicated that when the welding media of the invention are employed, very satisfactory welds are obtained in high sulphur or sulphur-banded plate. Strong welds are obtained and there is material improvement over results obtained using heretofore known media in that there is little, if any, susceptibility to cracking in the weld. Best results are obtained on welding such steels using welding rods containing no more than about 0.06% carbon and no more than about 0.05% silicon. In a particular instance, two plates composed of a sulphur-banded steel containing 0.28% carbon, 0.41% manganese and 0.06% sulphur were butt welded using a welding medium containing 39.04% manganese oxide, 26.14% silica, 23.21% alumina, 4.69% calcium fluoride, 3.83% lime, and minor proportions of iron oxide, titanium oxide and magnesium oxide as impurities. Tensile tests made on a 0.375 inch specimen prepared from the completed weld showed it to have a yield point in the as-welded condition of 44,400 pounds per square inch and a tensile strength of 72,450 pounds per square inch with an elongation in two inches of 26.6% and a reduction of area accompanying the elongation of 45.4%. No cracks were found in the weld.

The approximate compositions of media found by test to be satisfactory are set forth in the following table as specific examples of the invention. These media may be mixed with 5% to 10% by weight of calcium fluoride before use.

| No. | MnO | Al$_2$O$_3$ | SiO$_2$ | TiO$_2$+ Fe$_2$O$_3$ |
|---|---|---|---|---|
| | Percent | Percent | Percent | Percent |
| 1 | 36.6 | 39.8 | 19.4 | 4.3 |
| 2 | 38.3 | 26.8 | 29.3 | 2.3 |
| 3 | 44.4 | 15.4 | 38.7 | 1.5 |
| 4 | 46.2 | 27.8 | 23.2 | 2.7 |
| 5 | 49.0 | 22.1 | 26.3 | 2.7 |
| 6 | 61.0 | 10.0 | 28.1 | 0.9 |

While particular emphasis has been laid on the value of the invention for welding high sulphur or sulphur-banded steel, the welding media described are well suited for use in welding steels of many types, notably including steels containing more than nominal proportions of manganese.

I claim:

1. In a process of electrically welding sulphur-banded steel by fusion-deposition from a welding rod under a blanket of welding medium, the improvement which comprises blanketing the welding zone with a prefused composition comprising 30% to 65% manganese oxide calculated as MnO; 9% to 40% alumina; and the remainder principally silica.

2. In a process of electrically welding sulphur-banded steel by fusion-deposition of metal from a welding rod under a blanket of welding medium, the improvement which comprises blanketing the welding zone with a prefused composition comprising 30% to 65% manganese oxide calculated as MnO; 9% to 40% alumina; 4% to 15% calcium fluoride; and the remainder substantially silica, the silica content being in excess of 17%.

WILBER B. MILLER.